United States Patent [19]

Lindberg, deceased

[11] Patent Number: 4,667,255
[45] Date of Patent: May 19, 1987

[54] ELECTRONIC CAMERA EMPLOYING A SOLID-STATE IMAGE SENSOR

[75] Inventor: Charles A Lindberg, deceased, late of Menlo Park, Calif. by Verda Lindberg, executrix

[73] Assignee: Datacopy Corporation, Mountain View, Calif.

[21] Appl. No.: 78,204

[22] Filed: Sep. 24, 1979

[51] Int. Cl.⁴ .............................................. H04N 1/04
[52] U.S. Cl. ............................ 358/293; 358/213.13; 358/285; 358/294; 235/470
[58] Field of Search ...................... 358/293, 285, 213; 235/470; 250/566

[56] References Cited

U.S. PATENT DOCUMENTS

| | | | |
|---|---|---|---|
| 2,262,584 | 11/1941 | Herriott | 358/293 |
| 3,497,610 | 2/1970 | Langberg | 358/285 |
| 3,600,593 | 8/1971 | Berler | 235/470 |
| 3,812,459 | 5/1974 | MacNeil | 364/900 |
| 3,814,494 | 8/1982 | Shiragai | 350/6 |
| 3,867,569 | 2/1975 | Watson | 358/293 |
| 3,868,167 | 2/1975 | Schreiber | 350/7 |
| 3,914,546 | 4/1974 | Hamaker | 358/286 |
| 4,000,368 | 12/1976 | Tisue | 358/285 |
| 4,025,910 | 5/1977 | Walker | 358/213 |
| 4,149,090 | 4/1979 | Agulnek | 358/293 |
| 4,149,091 | 4/1979 | Crean | 358/293 |
| 4,150,873 | 4/1979 | Dali | 358/285 |
| 4,174,528 | 11/1979 | White | 358/213 |
| 4,513,390 | 4/1985 | Walter et al. | 364/900 |

OTHER PUBLICATIONS

"Two Dimensional Image Sensor Using One-Dimensional Sensor Array" by Williams, IBM Tech. Disc. Bull., vol. 21, No. 2, Jul. 1978, pp. 436, 437.

J. D. Finley, "The Eikonix Image Digitizer Model EC781", Sep. 18, 1978.

Lianza et al., "Image Digitization Using a Self-scanned Linear Photodiode Array", SPIE vol. 149, Applications of Digital Image Processing, 1978.

J. M. Lloyd, *Thermal Imaging Systems*, copyright 1975, Plenum Press, N.Y., Chapters 1, 7 and 8.

Primary Examiner—Howard Britton
Attorney, Agent, or Firm—Owen L. Lamb

[57] ABSTRACT

An electronic camera which focuses images of an object on the image plane by means of suitable lenses such as those employed in 35mm cameras. The optical system is held stationary while a self-scanning linear array, comprised of a row of light-sensitive devices, is moved a measured distance in the image plane. The linear array is continuously clocked as it is moved along the image plane. The resulting video signal output is a train of pulses, each proportional in magnitude to the light intensity falling on the corresponding light-sensitive device. An internal line-filament light source moves in synchronism with the linear array so that only the image slice being viewed by the array at any instant of time as it traverses the image field is being illuminated. The light source is directed onto the object plane through a beam splitter so that the light shines through the optical axis of the lens for maximum efficiency.

20 Claims, 7 Drawing Figures

ELECTRONIC CAMERA EMPLOYING A SOLID-STATE IMAGE SENSOR

BACKGROUND OF THE INVENTION

1. Field of the Invention

The invention relates to optical scanning systems, and more particularly, to apparatus for converting an optical image to electrical signals.

2. Description of the Prior Art

Prior scanners utilizing self-scanning linear arrays exist for scanning documents and converting the images scanned into electronic video-type signals. These types of scanners have the disadvantage that the scanner must be manually moved across the document, or the document must be moved relative to the scanner in order to scan the image.

Apparatus generally referred to as electronic cameras have been developed in order to provide a system capable of scanning a document while the scanner or camera is held stationary.

The prior art has developed along two separate paths. One type of system utilizes a matrix of solid-state, light-sensitive arrays at the image plane, wherein both the array and the lens are held stationary. The other type of system employs a linear array comprised of a single row of light-sensitive devices. A two dimensional image scan is achieved by electrically scanning in a first direction and mechanically scanning in a second direction perpendicular to the first direction.

An example of the first type of syste is shown in the Walker U.S. Pat. No. 4,025,910 which discloses a stationary array of storage elements located at the image plane of a camera. The array is an XY matrix of light-sensitive storage cells which are held stationary at the image plane i order to convert the image focused thereon into electrical signals. This type of system has the disadvantage of low resolution because of the low density of storage cells which can be fabricated in the array.

Examples of the second type of system are shown in the Berler U.S. Pat. No. 3,600,593 and Lianza U.S. Pat. No. 4,256,969 which disclose scanners in which a single row of photocells at the image plane convert an image focused thereon by a lens into electrical signals. A two-dimensional line scan of the image is achieved by electrical scanning in one direction and mechanical scanning in a perpendicular direction.

Neither the Berler patent or the Lianza patent disclose means for synchronizing the sequential array scans with the mechanical position intervals. This could result in loss of sampled data due to the differences between the actual position of mechanical parts of the apparatus and the clock signals that trigger the array scan.

A further example of the second type of system is described in an article by E. R. Williams, entitled *Two-dimensional Image Sensor Using One-dimensional Sensor Array*, published in the *IBM Technical Disclosure Bulletin*, Vol. 21, No. 2, July 1978. This article shows a scanner in which a one-dimensional array is mounted on an oscillating member. The frequency of oscillation and the sampling of the array are determined by a common clock. There are several disadvantages to such a device.

One disadvantage of the Williams device is that the sensor array follows a curved path and hence its movement does not match the image focal plane of a standard 35 mm camera lens. The image will be in focus only for very short excursions of the oscillating member, unless a specially designed negative lens is used to match the negative cylindrical curvature followed by the array. Thus the device cannot use standard, interchangeable lenses.

Another disadvantage of the Williams device is that, like Lianza and Berler discussed above, no means are provided for synchronizing the sequential array scans with the mechanical position intervals of the array as it moves in its curved path. This results in loss of sampled data at the far extremes of travel of the oscillating member, due to the difference between the actual mechanical position of the array and the clock signals that trigger the array scan.

A further disadvantage of the Williams device is that because the tuning fork oscillates, the speed of the array cannot be varied across the image plane. Because mechanical-to-electrical synchronization cannot be maintained, the array in Williams cannot be driven incrementally across the image plane to accommodate a wide variety of image capturing requirements.

SUMMARY OF THE INVENTION

It is a primary object of this invention to provide an image scanner which has high resolution and utilizes standard interchangeable lenses.

A further object of this invention is to provide a through-the-lens illumination system for use with an image scanner.

The above objects are accomplished in accordance with the invention by providing an image scanner which has a focusing lens for focusing the image to be scanned at the image focal plane of the lens. A carriage holds a self-scanning linear array at the image plane of the lens. A signal causes the carriage, and thus the array, to move at a measured rate of travel, continuously or in increments, in the image plane. The self-scanning cycle of the array is initiated at sequential position intervals of the array as the carriage is moved in the image plane. Either the signal which causes the carriage to move or a carriage position sensor is used to produce an encoded position signal. The position signal is used to synchronize the output pulses from the array with the mechanical position of the array, at sequential position intervals of the array. The result is a video output light scan in two dimensions of the image focused at the image focal plane.

In accordance with an aspect of the invention, a line-filament light source and a light-beam splitter are positioned so as to reflect the light from the light source through the lens to thereby illuminate the subject to be scanned. The light source and beam splitter are attached to the carriage so that the light source, beam splitter, and linear array act as a single integral unit.

In accordance with a further aspect of the invention, means are provided for tilting the carriage, and hence the array, in proportion to the amount of movement of the array away from the optical axis of the lens, so that the optical surface of the array maintains an optimum alignment with a predetermined point in the optical path of the imaging lens. This assures that the optical axis of the array points directly at the predetermined point of the imaging lens as a function of the distance of the lens from the image focal plane.

The invention has the advantage that it captures images in a manner similar to a photographic camera and therefore does not have to be moved or held in contact with the object being scanned. Since the camera uses standard 35 mm lenses, it can scan any size object by merely moving or changing lenses to change the field of view. Furthermore, a wide variety of photographic accessories are available for use with the system, making the system very versatile.

The invention has the further advantage of providing variable resolution and a variable image-capturing speed to suit the particular application, making the system very flexible.

The invention also has the advantage of being compatible with existing digital image-processing systems utilizing microprocessors.

The foregoing and other objects, features, and advantages of the invention will be apparent from the following, more particular description of preferred embodiments of the invention as illustrated in the accompanying drawings.

DESCRIPTION

Referring to FIGS. 1-6, the optical system of the image scanner will now be described. The camera mechanism is attached to a frame (10) which is supported above the document to be scanned by a stand (12). A standard lens housing (14) is connected to the frame (10) such that the lens can be moved for focusing. A carriage (16) is slidably mounted on the frame (10) by means of upper- and lower-support shafts (18, 20). The carriage (16) is driven back and forth in the horizontal direction by means of a motor-driven helical-threaded drive shaft (22) which is driven by an incremental or nonincremental motor (24) which drives a toothed belt (26) to turn the shaft (22).

A tilting-carrier subassembly (28) is attached to the carriage (16) and is connected through a follower lever (30) to a fixed-point control stud (32) on the movable portion of the lens housing (14). The subassembly (28) rotates about a shaft (29) shown in FIG. 4. Tension on the subassembly is maintained by a spring (31).

Figure 1:
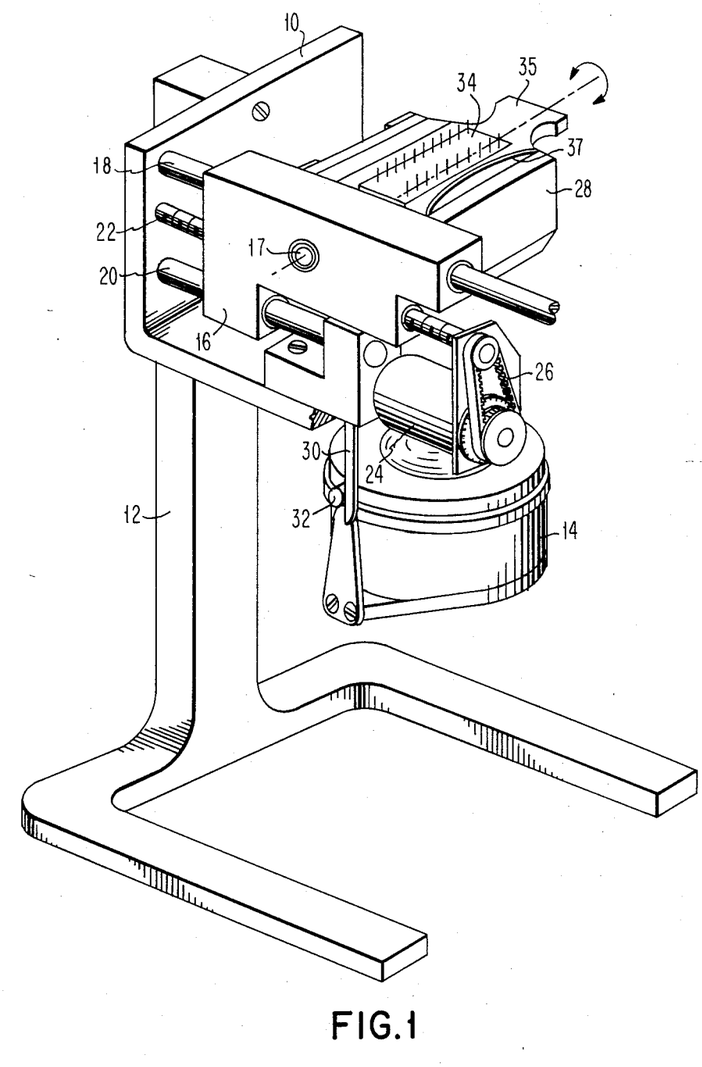
FIG. 1 is a perspective view from the back (left side) of an electronic camera constructed in accordance with the principles of the present invention.
Figure 2:
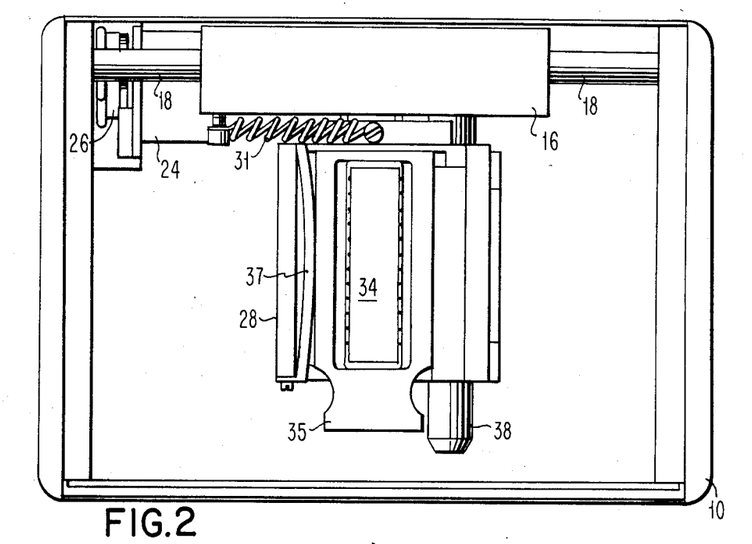
FIG. 2 is a top view of the camera shown in FIG. 1.
Figure 3:
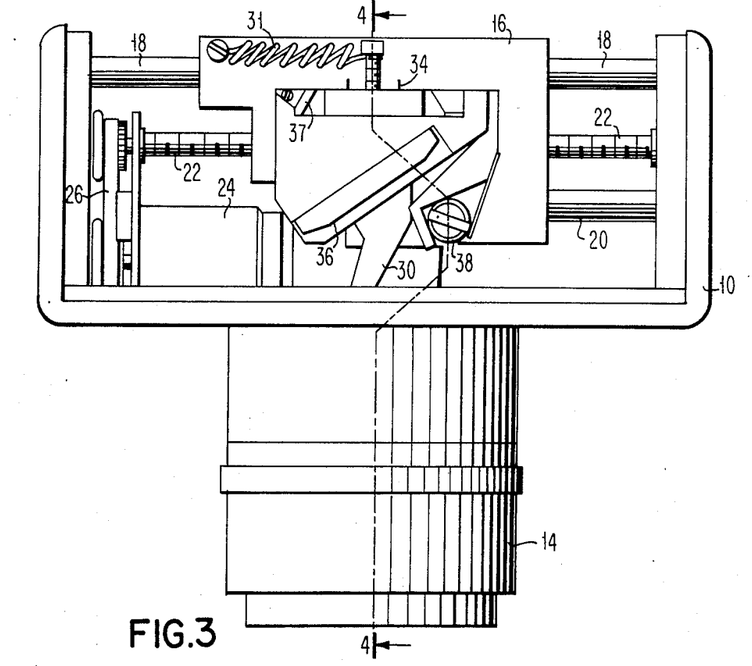
FIG. 3 is a front view of the camera shown in FIG. 1.
Figure 4:
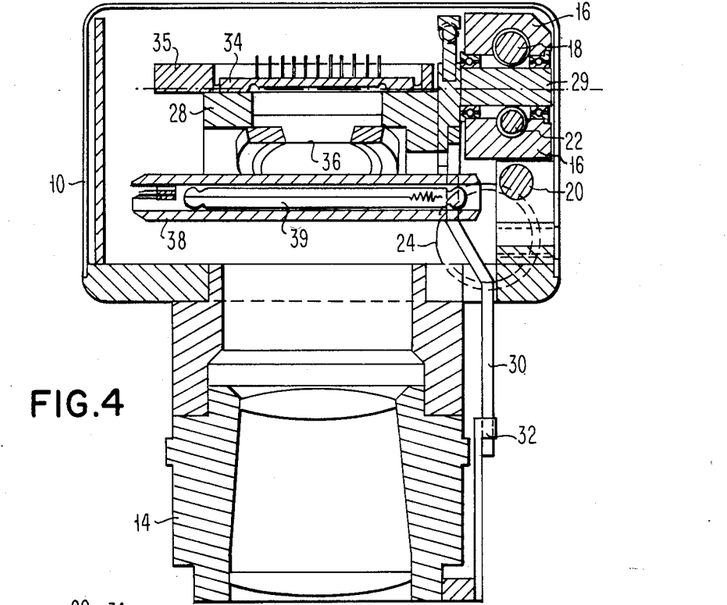
FIG. 4 is a side sectional view of the electronic camera taken along section lines 4—4 in FIG. 3.
Figure 5:
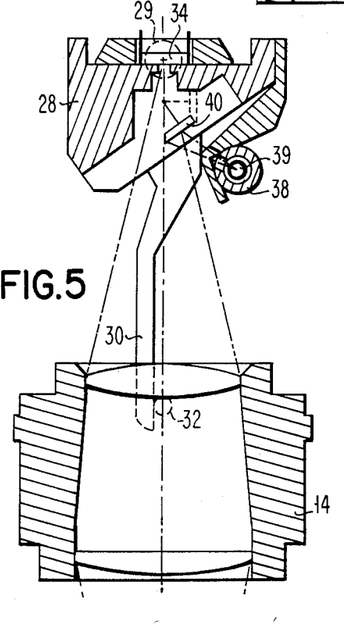
FIG. 5 is a front sectional view of the camera-tilting carriage subassembly and lens of FIG. 1 with the tilting carriage at its midpoint of travel, the lens in the close-up copy position, and a half-mirror beam splitter in place.

Referring to FIGS. 2-4, attached to the subassembly (28) is an image sensor (34), a beam-splitter mirror (36), and a line-filament lamp housing with lamp (38, 39). The image sensor is held in a removable holder (35). This holder is held in place by means of a leaf-spring (37). The image sensor is comprised of an array of light-sensitive devices, such as, but not limited to, one or more rows of photodiodes. The carriage (16) in FIGS. 1-4 is shown at its midpoint position in the line of travel of the carriage. When in this position, the optical surface of the image sensor (34) is parallel to and in the image plane of the lens (14). As the carriage (16) moves throughout the length of its travel along the shafts (18, 20), the image sensor (34) travels horizontally in the image plane.

As shown in FIG. 4, the subassembly (28) rotates about a tilt-axis which is the center of shaft (29). In the embodiment shown, the optical surface of the image sensor (34) is positioned on the tilt-axis. This causes the array to transcribe a straight line as the carriage moves and the subassembly tilts. However, it should be understood that for optical systems in which the image plane is not flat, convex or concave paths can be transcribed by the image sensor by offsetting the image sensor above or below the tilt-axis. This will cause the array to follow the curve of the image focal plane in the direction of the movement of the carriage. Distortion correction in the direction crosswise to the direction of movement can be achieved by constructing a nonflat array, or by tilting the array in the crosswise direction as the array is scanned.

The beam-splitter mirror (36) is positioned between the image sensor (34) and the lens along the optical axis of the lens. The beam splitter is set at an angle to the optical axis. The line-filament lamp housing (38) is positioned so that the long dimension of the lamp filament is parallel to the row of photodiodes in the image sensor (34).

The solid-state image sensor (34) may be of a type manufactured by Reticon Corporation of Sunnyvale, Calif. The solid-state image sensor comprises a shift register which is driven by a clock, such that each scan is initiated by a start pulse. The start pulse loads a bit which is clocked through the register, successively opening and closing switches and thus connecting each photodiode, in turn, to a video output line. As each photodiode is accessed, its capacitance is charged to the potential of the video line and is left open-circuited until the next scan. During the interval between scans, the capacitor is discharged by an amount equal to the instantaneous light-responsive photocurrent in the diode, integrated over the line scan. Each time a diode is sampled, this integrated charge loss must be replaced through the video line. The resulting video signal is a train of charge pulses, each proportional in magnitude to the light intensity falling on the corresponding photodiode.

A standard 35 mm film camera image field is approximately 1 inch by 1.5 inches in size at the focal plane. The self-scanning photodiode array (34) is 1 inch in length and is placed crosswise to long dimension of this field. The array is moved through the 1.5-inch length at a constant rate of travel or in fixed increments by means of the motor (24). The motor shaft has a position encoder thereon, or a position encoder may be placed on the carriage (16), such that the diode array self-scan output may be sampled at appropriate position intervals. This results in a two-dimensional electronic image of the 1-inch by 1.5-inch focal plane visual image. The beam splitter (36) and line-filament lamp housing (38) are precisely aligned with the diode array and are moved with it on the common carriage (16). The array/lamp/beam-splitter carriage subassembly (28) is pivotally mounted on the laterally-moving carriage (16). The subassembly is constrained through cam and follower elements, so that the optical surface of the array always points directly at a predetermined optical point of the imaging lens (14), which point is a function of the distance of the lens from the focal plane (see FIGS. 5 and 6).

Figure 6:
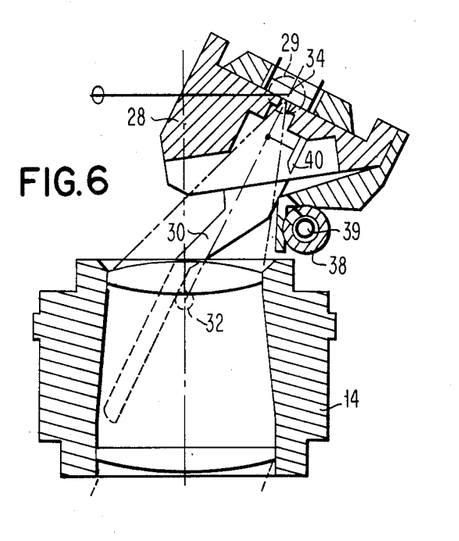
FIG. 6 is a front sectional view of the camera-tilting carriage subassembly and lens of FIG. 1 with the tilting carriage in its right-most tilted position with the half-mirror beam splitter retracted and the lens set at its infinity focus position.

The embodiment of the invention shown in FIGS. 1-4 employs a Pellicle whole-aperture-type beam splitter which intersects the full exit cone of the lens. An alternative embodiment, shown in FIGS. 5 and 6, employs a fully-reflecting mirror (40), which intersects only part of the exit cone of the lens. The part of the lens in line with the mirror is dedicated to light transmission only from light source 39. The remaining part of the lens transmits the image of the object being scanned only. Since the mirror is small in comparison to a whole-aperature beam splitter, it is easily moved out of the way when an external light source is available. This is illustrated in FIG. 6, which shows the mirror (40) in the retracted position.

Figure 7:
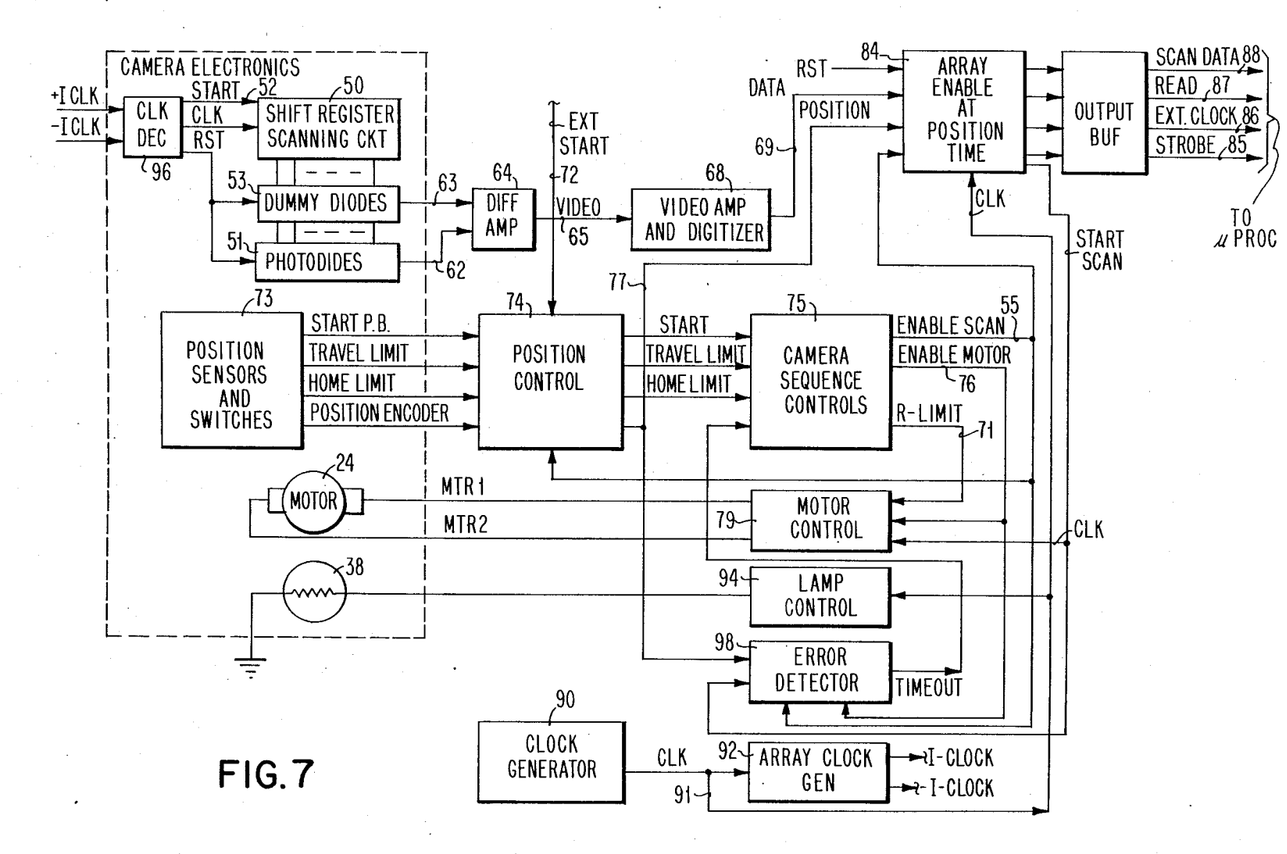
FIG. 7 is a block schematic diagram of control circuitry necessary to interface the camera of FIGS. 1-6 with an image-processing system.

FIG. 7 discloses the electronics necessary to interface the camera of the present invention with an image-processing system, such as that disclosed in U.S. Pat. No. 4,196,450 of Armin Miller and Maxwell G. Maginness for "Selective Copying Apparatus" filed July 14, 1978, which issued on Apr. 1, 1980.

A simplified schematic diagram of the image sensor (34, FIG. 1) is shown within the dotted lines in FIG. 7. Each cell consists of a photodiode within a row of photodiodes (51), and a dummy diode within a row of dummy diodes (53). Each diode has associated storage capacitance. The diodes are connected through switches to video and dummy recharge lines (not shown) which are common to all cells. A shift register (50) is driven by clock signals pulse I CLK and minus I CLK. Each scan of the shift register is initiated by the start scan pulse (52). The start pulse loads a bit which is clocked through the register, successively opening and closing the switches, thus connecting each photodiode in turn to the video buffer output (62) and each dummy diode to the dummy buffer output (63). As each photodiode is accessed, its capacitance is charged to the potential of the video buffer output (62) and is left open-circuited until the next scan. During the interval between scans, each capacitor is discharged by an amount equal to the instantaneous photocurrent in the diode, integrated over the line scan. Each time a diode is sampled, this integrated charge loss must be replaced through the video line. The resulting video buffer signal (62) is a train of charge pulses, each proportional in magnitude to the light intensity falling on the corresponding photodiode.

The dummy diode capacitance remains charged to the potential of the dummy buffer output (63). In addition to the signal charge, switching transients are capacitively coupled to the video buffer output by the switches. Since these same transients are introduced into the dummy buffer output (63), they are eliminated and a clean video signal recovered by reading out the video and dummy buffer outputs (62, 63) differentially in differential amplifier (64).

The video output (65) is amplified and shaped by a circuit (68), which converts the analog video signal to a digital data output (69) which is compatible with a standard microprocessor.

A carriage position encoder is provided to sense the position of the carriage at suitable increments along the length of its travel. (If a stepping motor is utilized, the signal which causes the motor to step is usd in place of the carriage position encoder output.) A home-limit switch and a travel-limit switch are provided to sense when the carriage is at the two extreme limits of its travel. A start pushbutton is provided to start the camera scan sequence. Alternatively, the scan sequence is started by an external start signal, 72. These four signals, output from logic 73, are fed to the position control (74) where they are utilized to generate the position signal (77). The position signal is fed to the array-enable circuits (84). The sequence controls (75) utilize the start pulse and the travel-and-home limit pulses to generate the enable scan pulse (55), the enable motor pulse (76), and the R-limit pulse (71), which are fed to the motor control circuits (79). The array-enable circuits (84) generate external clock pulses (86) each time a diode in the array is sampled. These clock pulses are used to sample the scan data (88). As the array is moved across the image plane, a strobe output (85) is triggered and held energized to provide a window for valid, clocked data. A read line (87) is energized for the duration of movement of the carriage from its home limit to its travel limit, to provide a window for the entire image frame. These signals are used by a microprocessor as described in the above-identified Miller et al patent application.

The array-enable circuits (84) receive clock timing (91) from a clock generator (90). Clock generator (90) also drives array-clock generator timing circuits (92) which provide synchronizing pulses to the camera clock decode circuit 96.

Error detector (98) receives the position signal, the start scan signal, the enable scan signal, and the enable motor signal. If these signals do not bear appropriate timing relationships to each other, a timeout signal is generated and sent to the camera sequence controls (75). The timeout signal is used to stop the motor.

Briefly, the logic of FIG. 7 operates as follows to capture images from objects scanned by the camera illustrated in FIG. 1. A scanned sequence is initiated by manually depressing the start pushbutton (within logic block 73) or by electronically energizing the external start line (72). In either case, the position control (74) responds by energizing the start output. The camera sequence controls (75) respond to the start signal and to the travel-limit and home-limit signals to generate the enable-motor signal (76) which drives the motor control circuit (79), the output of which energizes the motor (24). If the home-limit signal input to the camera-sequence controls is energized, then the R-limit line (71) is deenergized which causes the motor control (79) to drive the otor in the forward direction. If, however, the home-limit line is not energized, the R-limit line is energized which causes the motor control (79) to drive the motor in the reverse direction until the linear carriage reaches its home position. Once the linear carraige is in the home position, the motor control (79) energizes the motor in the forward direction, thus driving the linear carriage. At the same time, the camera-sequence controls energize the enable-scan line (55) which remains energized for the duration of the scan; that is, until the travel-limit line is energized by the position control (74). A position sensor is provided on the linear carriage or on the motor shaft to provide an output pulse at appropriate position intervals as the linear carriage moves. The output of the position encoder drives the position control circuit (74) which generates a position-signal output (77) during enable-scan time. This position signal is utilized by the array-enable circuits (74) to sample the data output (69).

The scanning cycle of the linear array and the synchronization of the control circuitry is provided by a basic clock generator (90). The output (91) from the clock generator is a timing pulse which is utilized by the array-enable circuit (84) to provide the appropriate synchronizing pulses for the transfer of digital data to an external microprocessor.

Additionally, the clock output pulse (91) drives an array clock generator (92) which generates in-phase and out-of-phase clocking pulse I-CLK and minus I-CLK. These pulses are decoded by the clock decoder (96). The clock decoder (96) generates a periodic start pulse (52) to initiate each scan of the circuit (50) and a clock pulse to provide the cell-to-cell sampling rate. In addition a reset pulse is generated to completely discharge the circuits 51, and 53.

To summarize, the linear-array scanner is continuously clocked to provide a series of video pulses (65) which are amplified and digitized by circuits (68) to produce a digital data output (69). This digital data output is sampled at appropriate position intervals as the array is moved in the focal plane, these intervals being delineated by position signal 77. The final output is scan dat (88) which is compatible with a microprocessor. The scan data is sampled by an appropriate timing signal (86) during an array scan cycle as indicated by energization of the strobe output (85).

SUMMARY

What has been described is an apparatus and method of scanning an object in order to electronically capture an image of the object. This is accomplished by focusing the object to be scanned at the image focal plane of an imaging lense. Next, a self-scanning-linear array of light-sensitive devices is moved in the image plane, such that light from the object focused at the image plane falls upon the light-sensitive devices. Finally, the output of the array is utilized at sequential position intervals of the array as the array is moved in the image plane, to thus provide a video-output line scan in two dimensions of the image focused at the image focal plane.

In those situations where ambient light is insufficient or otherwise inadequate—as, for example, when reflected from specular surfaces—an internal light source is utilized which comprises a line-filament lamp which is oriented in parallel with the linear array. The light from the lamp is reflected through the imaging lens to thereby illuminate the object to be scanned. The light source is moved in synchronism with the movement of the linear array, so that only the image slice being viewed by the array at any instant of time as the array moves is illuminated by the light source.

It will be understood by those skilled in the art that further improvement can be made in the image illumination by employing a field lens close to the object plane. The field lens can be held in place by the frame which supports the camera.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A scanner comprising:
focusing lens for focusing, at the image focal plane of said lens, the image of an object to be scanned;
a linear array of the type in which rows of light-sensitive devices are scanned in a first direction to provide a train of output pulses proportional in magnitude to the light intensity falling upon each successively scanned light-sensitive device;
first means for holding said array in the image plane of said lens;
second means connected to said first means for allowing movement of said first means and hence said array, relative to said lens, in a second direction which is perpendicular to said first direction, between two limits of travel of said array; and
third means, connected to said second means for causing said array to move between said two limits of travel;
fourth means for maintaining said array in said image plane throughout said movement of said array between said two limits of travel of said array caused by said third means;
fifth means for providing a position signal bearing a relationship to sequential position intervals of said array between said two limits of travel of said array; and,
sixth means connected to said array and to said fifth means for synchronizing said output pulses from said array with said position signal.

2. The combination in accordance with claim 1 characterized in that
said fourth means for causing said array to move in said image plane includes:
an incremental motor drive for causing said array to move in increments corresponding to said sequential position intervals of said array between said two limits of travel of said array.

3. The combination in accordance with claim 2 characterized in that said first means for holding said array in the image plane of said lens includes:
a light-beam splitter; and
a light source;
said beam splitter being positioned so as to reflect light from said light source through said lens to thereby illuminate said object to be scanned,
said light source, beam splitter, and linear array being movable as a unit by said second means across the field of scan in said image focal plane.

4. The combination in accordance with claim 3 characterized in that:
said beam splitter is a reflecting mirror which intersects one part of the exit cone of said lens, such that said one part of the lens in line with said mirror transmits light from said light source through said lens, while a remaining part of said lens allows the image in said object plane to be transmitted to said image plane.

5. The combination in accordance with claim 1 characterized in that said first means for holding said array in the image plane of said lens includes:
a light-beam splitter; and
a light source;
said beam splitter being positioned so as to reflect light from said light source through said lens to thereby illuminate said object to be scanned,
said light source, beam splitter, and linear array being movable as a unit by said second means across the field of scan in said image focal plane.

6. The combination in accordance with claim 5 characterized in that:

said beam splitter is a reflecting mirror which intersects one part of the exit cone of said lens, such that said one part of the lens in line with said mirror transmits light from said light source through said lens, while a remaining part of said lens allows the image in said object plane to be transmitted to said image plane.

7. The combination in accordance with claim 5 characterized in that said fourth means for causing said array to move in said image plane includes:

an incremental motor drive for causing said array to move in increments corresponding to said sequential position intervals of said array between said two limits of travel of said array.

8. The scanner in accordance with claim 1 characterized in that said fifth means for providing a position signal includes seventh means for sensing the mechanical position of said array at sequential position intervals of said array between said two limits of travel of said array.

9. The combination in accordance with claim 8 characterized in that said fourth means for causing said array to move in said image plane includes:

an incremental motor drive for causing said array to move in increments corresponding to said sequential position intervals of said array between said two limits of travel of said array.

10. The combination in accordance with claim 8 characterized in that said seventh means for sensing the mechancal position of said array relative to said lens includes:

an encoder for electrically encoding said mechanical position of said array at position intervals of said array in said image plane; and, a limit sensor for sensing the condition that said array is at one of said two limits of travel in said image plane.

11. The combination in accordance with claim 10 characterized in that said fourth means for causing said array to move in said image plane includes:

an incremental motor drive for causing said array to move in increments corresponding to said sequential position intervals of said array between said two limits of travel of said array.

12. The combination in accordance with claim 10 characterized in that said first means for holding said array in the image plane of said lens includes:

a light-beam splitter; and a light source;

said beam splitter being positioned so as to reflect light from said light source through said lens to thereby illuminate said object to be scanned, said light source, beam splitter, and linear array being movable as a unit by said second means across the field of scan in said image focal plane.

13. The combination in accordance with claim 12 characterizedl in that:

said beam splitter is a reflecting mirror which intersects one part of the exit cone of said lens, such that said one part of the lens in line with said mirror transmits light from said light source through said lens, while a remaining part of said lens allows the image in said object plane to be transmitted to said image plane.

14. A method of scanning an object comprising the steps of:

(a) focusing the image of an object to be scanned at the image focal plane of an imaging lens;

(b) providing an array of light-sensitive devices in said image focal plane in which rows of light-sensitive devices are scanned in a first direction to provide a train of output pulses proportional in magnitude to the light intensity falling upon each successively scanned light-sensitive device;

(c) moving said array in a second direction which is perpendicular to said first direction;

(d) maintaining said array throughout said movement in said second direction in the image focal plane of said lens, such that light from the object focused at said image focal plane falls upon said light-sensitive devices to thereby produce said ouput pulses from said array;

(e) providing a position signal bearing a relationship to the position of said array at sequential position intervals of said array in the image focal plane of said lens; and, (f) synchronizing said output pulses from said array with said position signal.

15. The method in accordance with claim 14, characterized by further comprising the steps of:

reflecting light from a line-filament light source oriented in parallel with said array, through part of said imaging lens to thereby illuminate said object to be scanned, while allowing light reflected from said object so illuminated to pass through another part of said lens to said array; and moving said light source in synchronism with the movement of said array, so that only the image slice being viewed by said array at an instant of time as said array traverses the image field in the image focal plane is illuminated by said light source.

16. The method in accordance with claim 14 characterized in that said step for sensing the mechanical position of said array relative to said lens includes the steps of:

electrically encoding said mechanical position of said array at position intervals of said array in said image plane; and, sensing the condition that said array is at an extreme limit of travel in said image plane.

17. The method in accordance with caim 16, characterized by further comprising the steps of:

reflecting light from a line-filament light source oriented in parallel with said array, through part of said imaging lens to thereby illuminate said object to be scanned, while allowing light reflected from said object so illuminated to pass through another part of said lens to said array; and moving said light source is synchronism with the movement of said array, so that only the image slice being viewed by said array at any instant of time as said array traverses the image field in the image focal plane is illuminated by said light source.

18. The method in accordance with claim 14 characterized in that said step for providing a position signal includes the step of sensing the mechanical position of said array relative to said lens.

19. The method in accordance with claim 18 characterized in that said step for sensing the mechanical position of said array relative to said lens includes the steps of:
  electrically encoding said mechanical position of said array at position intervals of said array in said image plane; and,
  sensing the condition that said array is at an extreme limit of travel in said image plane.

20. The method in accordance with claim 18, characterized by further comprising the steps of:
  reflecting light from a line-filament light source oriented in parallel with said array, through part of said imaging lens to thereby illuminate said object to be scanned, while allowing light reflected from said object so illuminated to pass through another part of said lens to said array; and
  moving said light source in synchronism with the movement of said array, so that only the image slice being viewed by said arrow at any instant of time as said array traverses the image field in the image focal plane is illuminated by said light source.

* * * * *